US006517947B2

(12) United States Patent
Bauer et al.

(10) Patent No.: US 6,517,947 B2
(45) Date of Patent: Feb. 11, 2003

(54) AMINE MODIFIED GELATIN LAYER FOR IMPROVED ADHESION OF PHOTOGRAPHIC ELEMENTS AFTER ANNEALING

(75) Inventors: Charles L. Bauer, Webster, NY (US); Janglin Chen, Rochester, NY (US); Kenneth G. Harbison, Rochester, NY (US); Hwei-Ling Yau, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/854,781

(22) Filed: May 14, 2001

(65) Prior Publication Data

US 2002/0122951 A1 Sep. 5, 2002

Related U.S. Application Data

(63) Continuation-in-part of application No. 09/751,550, filed on Dec. 29, 2000.

(51) Int. Cl.[7] .............................. B32B 9/02; B32B 9/04; B32B 27/36; B32B 27/08

(52) U.S. Cl. ................................ 428/475.2; 428/474.4; 428/478.2; 428/480; 427/372.2; 427/384; 427/385.5; 427/407.1; 427/412.1; 427/412.5; 427/414; 430/523; 430/531; 430/533; 430/539

(58) Field of Search .............................. 428/480, 474.4, 428/475.2, 478.2; 430/523, 531, 539, 533; 427/407.1, 412.1, 412.5, 414, 372.2, 384, 385.5

(56) References Cited

U.S. PATENT DOCUMENTS

| | | | | |
|---|---|---|---|---|
| 2,627,088 A | | 2/1953 | Alles et al. | |
| 2,779,684 A | | 1/1957 | Alles | |
| 3,143,421 A | | 8/1964 | Nadeau et al. | |
| 3,201,249 A | | 8/1965 | Pierce et al. | |
| 3,501,301 A | | 3/1970 | Nadeau et al. | |
| 3,988,157 A | | 10/1976 | Van Paesschen et al. | |
| 4,407,939 A | | 10/1983 | Naoi et al. | |
| 5,219,992 A | | 6/1993 | Specht et al. | |
| 5,719,016 A | | 2/1998 | Christian et al. | |
| 5,895,744 A | * | 4/1999 | Chen et al. | 430/533 |
| 6,040,127 A | * | 3/2000 | Kuramitsu et al. | 430/567 |

FOREIGN PATENT DOCUMENTS

| | | |
|---|---|---|
| EP | 614 930 | 9/1994 |
| EP | 0 849 628 A1 | 6/1998 |

* cited by examiner

*Primary Examiner*—Vivian Chen
(74) *Attorney, Agent, or Firm*—Doreen M. Wells

(57) ABSTRACT

An imaging support comprising: a polyester support; an adhesive layer superposed to said support; and on the adhesive layer: an amine modified gelatin subbing layer, the amine modified gelatin having the formula:

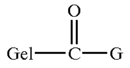

wherein Gel is a gelatin polypeptide,

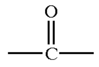

is a carbonyl group from a free carboxyl group in aspartic acid or a glutamic acid moiety in said polypeptide, and G is

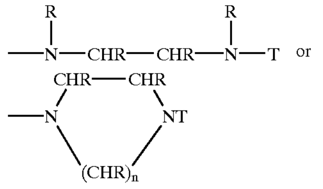

wherein each R is independently hydrogen or a primary or secondary alkyl group of one to about four carbon atoms, n is a positive integer having a value of one to about four, and T is a hydrogen or

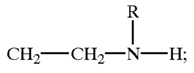

said modified gelatin being further characterized by having from 1% to about 40% of the free carboxyl groups in aspartic and glutamic acid moieties in said polypeptide being substituted with G-groups; wherein said support has been annealed at a temperature that is 50 to 5° C. less than the glass transition temperature of the support for at least 6 hours.

8 Claims, No Drawings

AMINE MODIFIED GELATIN LAYER FOR IMPROVED ADHESION OF PHOTOGRAPHIC ELEMENTS AFTER ANNEALING

CROSS REFERENCE TO RELATED APPLICATIONS

This application is a continuation-in-part of application Ser. No. 09/751,550, filed Dec. 29, 2000, which is being abandoned under a separately filed paper.

This application relates to commonly assigned copending application Ser. No. 09/751,114, ANNEALABLE IMAGING SUPPORT, filed Dec. 29, 2000 and Continuation-in-Part application Ser. No. 09/854,794 filed herewith. This application relates to commonly assigned copending application Ser. No. 09/751,116, FILM SUPPORT WITH IMPROVED ADHESION UPON ANNEALING, filed Dec. 29, 2000 and Continuation-in-Part application Ser. No. 09/854,873 filed herewith. This application relates to commonly assigned copending application Ser. No. 09/751,724, FILM SUPPORT WITH ANNEALABLE LAYER AND IMPROVED ADHESION, filed Dec. 29, 2000 and Continuation-in-Part application Ser. No. 09/854,732 filed herewith. This application relates to commonly assigned copending application Ser. No. 09/751,725, ANNEALABLE IMAGING SUPPORT CONTAINING A GELATIN SUBBING LAYER AND AN ANTISTATIC LAYER, filed Dec. 29, 2000 and Continuation-in-Part application Ser. No. 09/854,793 filed herewith.

FIELD OF THE INVENTION

This invention relates to light sensitive imaging elements in general and in particular to gelatin based subbing layers for improving the adhesion of photographic emulsion to a polyester support upon thermal annealing.

BACKGROUND

To adhere a photographic emulsion to a polyester support, either separate adhesive (subbing) layers or surface treatments are required. These adhesive systems must work both with raw and processed film in the dry state, and must also adhere when the film is wet during the development process. In addition, it is desirable to heat-treat or anneal the polyester support to impart the required physical properties, particularly to reduce core set to an acceptable level for recent applications such as small format films for use in smaller cameras. Furthermore, annealing the support with subbing or backing layers is advantageous for manufacturing efficiency.

A common subbing package uses materials such as poly (methyl acrylate-co-vinylidene chloride-co-itaconic acid) or poly(acrylonitrile-co-vinylidene chloride-co-acrylic acid) (disclosed in U.S. Pat. Nos. 3,201,249 and 3,143,421) as the first adhesive layer on the polyester support. This is then overcoated with a thin gelatin layer to form the adhesive system. To meet core-set criteria, an advanced photo system (APS) film uses a poly(ethylene naphthalate) support which is annealed at elevated temperatures. To reduce manufacturing costs, the subbing layers (vinylidene chloride polymer and gel sub) are applied to the support and it is then annealed. It has been observed that the wet adhesion properties of this system are significantly degraded after annealing.

To obtain acceptable adhesion of a silver-halide emulsion layer or a backing layer to a polyester support, a variety of methods have been used including, surface treatment of the support or application of adhesion promoting or subbing layers either prior to orientation and crystallization of the support or post-orientation. Adhesion of the anchoring, or subbing layer is promoted by a variety of methods, including the use of chlorine-containing copolymers, as described in U.S. Pat. Nos. 2,627,088; and 3,143,421. The application of the adhesive layer prior to the orientation and heat setting or crystallization of the polyester, and the addition of organic solvents which attack the polyester film surface is described in U.S. Pat. No. 3,501,301. In addition, a subsequent gelatin-containing layer is often required on the emulsion side of the support, prior to photographic emulsion coating, for adequate adhesion.

U.S. Pat. No. 4,407,939 (Fuji) describes the use of a gel sub layer between the subbing and emulsion. The gelatin used had been modified to increase the number of carboxylic acid groups, for example by reacting the gelatin with an acid anhydride. It does not describe the use of amine modified gels.

U.S. Pat. No. 5,219,992 (Kodak) describes the preparation and use of amine modified gelatin for differential hardening of multilayered photographic elements. It does not teach the use of these materials as annealable subbing layers.

EP #614,930-A1 (Agfa) describes the use of amine modified gelatins with increased reactivity to vinylsulphonyl hardeners for differential hardening in emulsions. It does not teach the use of these materials as annealable subbing layers.

Therefore it is the objective of this invention to provide a subbing system that provides good adhesion of the emulsion after annealing.

SUMMARY OF THE INVENTION

The present invention solves the problem discussed above by using a gelatin material is that has been derivatized to increase the number of reactive amine groups.

An imaging support comprising:

a polyester support;

an adhesive layer superposed to said support; and on the adhesive layer an amine modified gelatin subbing layer, the amine modified gelatin having the formula:

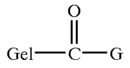

wherein Gel is a gelatin polypeptide,

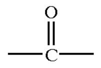

is a carbonyl group from a free carboxyl group in aspartic acid or a glutamic acid moiety in said polypeptide, and G is

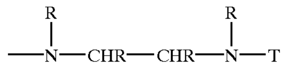

or

-continued

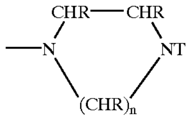

wherein each R is independently hydrogen or a primary or secondary alkyl group of one to about four carbon atoms, n is a positive integer having a value of one to about four, and T is a hydrogen or

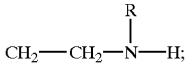

said modified gelatin being further characterized by having from 1% to about 40% of the free carboxyl groups in aspartic and glutamic acid moieties in said polypeptide being substituted with G-groups;

wherein said support has been annealed at a temperature that is 50 to 5° C. less than the glass transition temperature of the support for at least 6 hours.

Also disclosed is:

A method for preparing an imaging support comprising:

(a) providing a support;

(b) coating an adhesive layer onto said support;

(c) coating an amine modified gelatin subbing layer onto said adhesive layer wherein the gelatin has the formula:

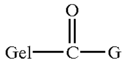

wherein Gel is a gelatin polypeptide,

is a carbonyl group from a free carboxyl group in aspartic acid or a glutamic acid moiety in said polypeptide, and G is

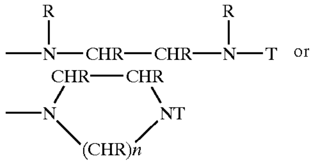

wherein each R is independently hydrogen or a primary or secondary alkyl group of one to about four carbon atoms, n is a positive integer having a value of one to about four, and T is a hydrogen or

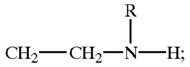

said modified gelatin being further characterized by having from 1% to about 40% of the free carboxyl groups in aspartic and glutamic acid moieties in said polypeptide being substituted with G-groups; and (c) annealing the coating at a temperature that is 50 to 5° C. less than the glass transition temperature of the support for at least 6 hours.

DETAILED DESCRIPTION OF THE INVENTION

The present invention is an imaging support which includes a base, preferably comprising polyester, most preferably comprising polyethylene naphthalate (PEN). An adhesive layer is superposed on the base and an amine modified gelatin-containing subbing layer is superposed on the adhesive layer. The imaging support is then annealed at a temperature that is 50 to 5° C. less than the glass transition temperature of the support for at least 6 hours.

In a further embodiment, a method for making an imaging support is disclosed.

The imaging support of this invention is suitable for use in various imaging elements including, for example, photographic, electrostatographic, photothermographic, migration, electrothermographic, dielectric recording, and thermal dye transfer imaging elements. Details with respect to the composition and function of this wide variety of imaging elements are provided in U.S. Pat. No. 5,719,016. Imaging elements that can be provided with a support in accordance with this invention can differ widely in structure and composition. For example, they can vary in regard to the type of support, the number and composition of the image forming layers, and the number and kinds of auxiliary layers included in the elements. The image forming layer(s) of a typical photographic imaging element includes a radiation sensitive agent (e.g., silver halide) dispersed in a hydrophilic water-permeable colloid. Suitable hydrophilic colloids include both naturally-occurring substances such as proteins, for example, gelatin, gelatin derivatives, cellulose derivatives, polysaccharides such as dextran, gum arabic, and the like; as well as synthetic polymers, for example, water-soluble polyvinyl compounds such as poly (vinylpyrrolidone), acrylamide polymers, and the like. A common example of an image-forming photographic layer is a gelatin-silver halide emulsion layer. In particular, the photographic elements can be still films, motion picture films, x-ray films, graphic arts films or microfiche. They can be black-and-white elements, color elements adapted for use in negative-positive process or color elements adapted for use in a reversal process.

Polymer film supports which are useful for the present invention include polyester supports such as -1,4-cyclohexanedimethylene tereplithalate, polyethylene 1,2-diphenoxyethane-4,4'-dicarboxylate, polybutylene tereplithalate, and polyethylene naphthalate and the like; and blends or laminates thereof. Particularly preferred are polyethylene naphthalate and blends of polyethylene naphthalate with polyethylene tereplithalate. Additional suitable polyester supports, polyester copolymers and polyester blends are disclosed in detail in U.S. Pat. No. 5,580,707.

Film supports can be surface-treated on either or both sides prior to application of the gelatin subbing layer by various processes including corona discharge, glow discharge, LTV exposure, flame treatment, electron-beam treatment or treatment with adhesion-promoting agents including dichloroacetic acid and trichloroacetic acid, phenol derivatives such as resorcinol and p-chloro-m-cresol, solvent washing prior to overcoating with a subbing layer of the present invention. In addition to surface treatment or treatment with adhesion promoting agents, additional adhesion promoting primer or tie layers containing polymers such as vinylidene chloride-containing copolymers, butadiene-based copolymers, glycidyl acrylate or methacrylate-containing copolymers, maleic anhydride-containing copolymers, condensation polymers such as polyesters, polyamides, polyurethanes, polycarbonates, mixtures and blends thereof, and the like may be applied to the polyester support. Particularly preferred primer or tie layers comprise a chlorine containing latex or solvent coatable chlorine containing polymeric layer. Vinyl chloride and vinylidene chloride containing polymers are preferred as primer or subbing layers of the present invention.

The subbing or primer composition may be applied to the polyester base using an in-line process during the base manufacture or by an off-line process. When applied in an in-line process, the layer may be coated on the polyester base prior to orientation, after orientation, or after uniaxial orientation but before biaxial orientation. The primer composition described is typically applied in accordance with U.S. Pat. Nos. 2,627,088 and 3,143,421. The coating formulation is coated onto the amorphous support material, dried, and then the resulting film is oriented by stretching and other steps applied to the film such as heat setting, as described in detail in U.S. Pat. No. 2,779,684. Accordingly, the particular support film used, the procedure and apparatus for the coating thereof and the orientation of the film are not limitations of the present invention. Any of the usual coating apparatus and processing steps employed in the art may be employed in treating the film product of the present invention. For the imaging side of the support, a hydrophilic subbing layer containing the amine modified gelatin of the invention is applied to the polyester film base prior to heat-treatment. The subbing layer may be applied to a polyester support which has been surface treated or be superposed on any suitable primer layer. A preferred subbing layer for the imaging side of the support is described in U.S. Ser. No. 09/067,306 incorporated by reference herein. The gelatin subbing layer is typically used in an amount of from 0.25 to 5 weight percent, preferably 0.5 to 1 weight percent The subbing layer may include addenda such as dispersants, surface active agents, plasticizers, coalescing aids, solvents, co-binders, soluble dyes, solid particle dyes, haze reducing agents, adhesion promoting agents, hardeners, antistatic agents, matting agents, etc. For altering the coating and drying characteristics it is a common practice in the art to use surface active agents (coating aids) or to include a water miscible solvent in an aqueous dispersion. Suitable solvents include ketones such as acetone or methyl ethyl ketone, and alcohols such as ethanol, methanol, isopropanol, n-propanol, and butanol. Underlying subbing, primer or tie layers may also be surface treated, for example by corona discharge treatment, to aid wetting by the gelatin subbing formulation.

Coated supports in accordance with the present invention having amine modified gelatin-containing subbing layers, are subjected to an extended heat treatment or annealing step after conventional support film manufacturing heat treatment to reduce core-set curling tendencies of the support. Such "post manufacture" heat tempering or annealing includes heating the coated film support at a temperature that is 50 to 5° C. less than the glass transition temperature of the support for at least 6 hours. The heat tempering or annealing step for reducing core-set curling tendencies is distinguishable from typical support manufacturing heat treatment in that it is performed after the support is wound on a roll rather than as part of the primary support manufacturing process. In a preferred embodiment of the present invention, the imaging support consists of a polyethylene-2,6-naphthalate film base which is coated with vinylidene chloride primer layers. A modified gelatin subbing layer is applied on one side of the support. With respect to polyethylene-2, 6naphthalate, the Tg is about 140 deg. C., and the heat treatment temperature is from 90 deg. C. to 120 deg. C., preferably from 100 deg. C. to 115 deg. C., and more preferably from 105 deg. C. to 115 deg. C.

Photographic elements in accordance with the preferred embodiment of the invention can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming; units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, antihalation layers, overcoat layers, subbing layers, and the like.

The method of the present invention is illustrated by the following detailed examples of its practice. However, the scope of this invention is by no means limited to these illustrative examples.

EXAMPLE 1

The modified gels used in the following examples were prepared as described in U.S. Pat. No. 5,219,992. The amines used were ethylene diamine and piperazine forming modified gels designated Ed-gel and Pi-gel, respectively. Since the Ed-gel and Pi-gel were formed from diamines, they have increased reactivity with amine reactive gelatin hardeners such as bis(vinylsulfonyl)methane. Other suitable amines are disclosed in U.S. Pat. No. 5,219,992.

To form the photographic elements, first a sheet of polyethylene naphthalate was melt cast. Onto this was coated a subbing layer of poly(acrylonitrile-co-vinylidene chloride-co-acrylic acid), 15/79/6 wt ratio. This was then stretched and tentered at elevated temperatures to give approximately a 90 $\mu$m PEN support with a 90 nm thick subbing layer. A 0.132 g/m$^2$ thick layer of gelatin (to prepare the Comparative Examples) or amine modified gelatin (to prepare the Examples) was then applied on top of this. The samples were then wound up in roll form and annealed for 3 days at 110° C. plus 2 days at 100° C. After annealing, a photographic emulsion was then applied.

The samples were incubated for 24 hrs at 32.2° C./50% RH and then evaluated for wet adhesion using a Wet Wear Test. See Table below for results. The dry adhesion for the photographic emulsion was also evaluated with no observed adhesion failures.

Wet Wear Test: A 35 mm×12.7 cm strip of the coating is soaked at 37.8° C. for 3 min. 15 sec. in Kodak Flexicolor Developer Replenisher. The strip is then placed in a small trough with developer solution. A weighted (2200 g) HK88 woven Velcro pad (0.88 mil nylon thread, hook side), 35 mm diameter, is placed on top. The pad is moved across the sample 60 times. The amount of emulsion removed is then assessed in units of percent removed. The lower the value, the better the wet adhesion of the system.

TABLE 1

Wet Adhesion Results

| | Gel Sub | | Wet Adhesion (% removed) |
|---|---|---|---|
| | Acid processed pig skin gelatin | Comparison | 35 |
| $el\text{-}C(=O)\text{—}NHCH_2CH_2NH_2$ | Ed-Gel | Invention | 11 |
| 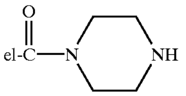 | Pi-gel | Invention | 1 |

These results show that by using amine modified gelatins, improved wet adhesion of the photographic emulsion to the anneal subbed support is obtained.

EXAMPLE 2

The samples in this example were prepared in a manner as described in Example 1 except that different gel sub compositions were used. The different layers are described in Table 2 along with the wet adhesion results. After annealing with the gel sub, the support was overcoated with a photographic emulsion and the wet adhesion evaluated as described in Example 1.

TABLE 2

| Gel sub Description | Dry Coverage ($g/m^2$) | | Wet adhesion (% removed) |
|---|---|---|---|
| Lime processed cow bone gelatin | .099 | Comparison | 86 |
| Lime processed gel/Ed-gel 40/60 | .0396/.0594 | Invention | 5.2 |
| Lime processed gel/Ed-gel 20/80 | .0198/.0792 | Invention | 12 |
| Ed-gel | .099 | Invention | 13 |
| Pi-gel | .099 | Invention | 22 |
| Phthalated-gel* | .099 | Comparison | 88 |

Ed-gel: ethylene diamine modified gel
Pi-gel: piperazine modified gel
*This phthalated-gel is similar to that described in US 4,407,939.

This example shows that good wet adhesion may be obtained by mixing the amine derivatized gelatin with regular gelatin.

What is claimed is:

1. An imaging support comprising:

a polyester base;

an adhesive layer superposed to said base; and on the adhesive layer an amine modified gelatin subbing layer, the amine modified gelatin having the formula:

$$Gel\text{—}C(=O)\text{—}G$$

wherein Gel is a gelatin polypeptide, $$\text{—}C(=O)\text{—}$$

is a carbonyl group from a free carboxyl group in aspartic acid or a glutamic acid moiety in said polypeptide, and G is

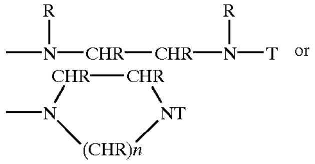

wherein each R is independently hydrogen or a primary or secondary alkyl group of one to about four carbon atoms, n is a positive integer having a value of one to about four, and T is a hydrogen or $$CH_2\text{—}CH_2\text{—}N(R)\text{—}H;$$

said modified gelatin being further characterized by having from 1% to about 40% of the free carboxyl groups in aspartic and glutamic acid moieties in said polypeptide being substituted with G-groups;

wherein said support has been annealed at a temperature that is 50 to 5° C. less than the glass transition temperature of the support for at least 6 hours.

2. The imaging support of claim 1 wherein the polyester base comprises polyethylene terephthalate, poly-1,4-cyclohexanedimethylene terephthalate, polyethylene 1,2-diphenoxyethane-4,4-dicarboxylate, polybutylene terephthalate or polyethylene naphthalate.

3. The imaging support of claim 1 wherein the polyester comprises polyethylene naphthalate.

4. The imaging support of claim 1 wherein the support is for a photographic element.

5. A method for preparing an imaging support, the method comprising:

(a) providing a base;

(b) coating an adhesive layer onto said base;

(c) coating an amine modified gelatin subbing layer onto said adhesive layer wherein the gelatin has the formula:

$$Gel\text{—}C(=O)\text{—}G$$

wherein Gel is a gelatin polypeptide, $$\text{—}C(=O)\text{—}$$

is a carbonyl group from a free carboxyl group in aspartic acid or a glutamic acid moiety in said polypeptide, and G is $$\text{—}N(R)\text{—}CHR\text{—}CHR\text{—}N(R)\text{—}T \quad \text{or}$$

-continued

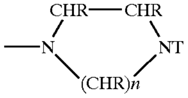

wherein each R is independently hydrogen or a primary or secondary alkyl group of one to about four carbon atoms, n is a positive integer having a value of one to about four, and T is a hydrogen or

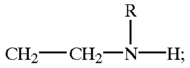

said modified gelatin being further characterized by having from 1% to about 40% of the free carboxyl groups in aspartic and glutamic acid moieties in said polypeptide being substituted with G-groups; and (c) annealing the coating at a temperature that is 50 to 5° C. less than the glass transition temperature of the support for at least 6 hours.

6. The method of claim 5 wherein the base comprises polyester.

7. The method of claim 5 wherein the base comprises polyethylene naphthalate (PEN).

8. The method of claim 5 wherein the support is for a photographic support element.

* * * * *